United States Patent [19]

Watanabe et al.

[11] Patent Number: 5,510,908
[45] Date of Patent: Apr. 23, 1996

[54] IMAGE READING DEVICE FOR REMOVING THE BACKGROUND OF A SCANNED ORIGINAL DOCUMENT

[75] Inventors: Yoshio Watanabe, Hiratsuka; Yasuo Abuyama, Ebina, both of Japan

[73] Assignee: Kabushiki Kaisha Toshiba, Kawasaki, Japan

[21] Appl. No.: 403,128

[22] Filed: Mar. 13, 1995

Related U.S. Application Data

[63] Continuation of Ser. No. 277,261, Jul. 21, 1994, abandoned, which is a continuation of Ser. No. 35,790, Mar. 23, 1993, abandoned.

[30] Foreign Application Priority Data

Sep. 25, 1992 [JP] Japan .................................. 4-280437

[51] Int. Cl.$^6$ .................................. H04N 1/04; H04N 1/38
[52] U.S. Cl. .......................... 358/448; 358/464; 358/488; 358/494
[58] Field of Search ........................... 358/464, 488, 358/494, 448, 449, 452, 453, 474, 497; 382/199

[56] References Cited

U.S. PATENT DOCUMENTS

| | | | |
|---|---|---|---|
| 4,547,810 | 10/1985 | Rutherford et al. | 358/492 |
| 4,763,200 | 9/1988 | Nakatani et al. | 358/449 |
| 4,831,458 | 5/1989 | Watanabe . | |
| 4,899,227 | 2/1990 | Yamada | 358/452 |
| 5,157,740 | 10/1992 | Klein et al. | 358/465 |
| 5,253,081 | 10/1993 | Shoji et al. | 358/444 |
| 5,260,804 | 11/1993 | Fukutomi et al. | 358/453 |
| 5,289,296 | 2/1994 | Yamada | 358/464 |

FOREIGN PATENT DOCUMENTS

| | | |
|---|---|---|
| 0218447 | 4/1987 | European Pat. Off. . |
| 0371744 | 6/1990 | European Pat. Off. . |
| 2142499 | 1/1985 | United Kingdom . |
| 89/01268 | 2/1989 | WIPO . |

*Primary Examiner*—Scott A. Rogers
*Attorney, Agent, or Firm*—Foley & Lardner

[57] ABSTRACT

In an image forming device including an image reading device, dot signals for one scanning line are detected by a CCD sensor. After their A/D conversion and shading-correction, the detected signals are supplied to a comparison processor. In the comparison processor, the dot signals corresponding to the leading and tailing edges of the original are detected from the dot signals for the one scanning line. The rest of the dot signals are judged to be those other than from the original in the selector, and converted into white dot signals. Consequently, the region other than the original is formed in white for each line. Thus, regardless of the original sheet size, or even if the sheet is obliquely placed, the region other than the original can be detected, and the region can be erased by adding a white background.

16 Claims, 5 Drawing Sheets

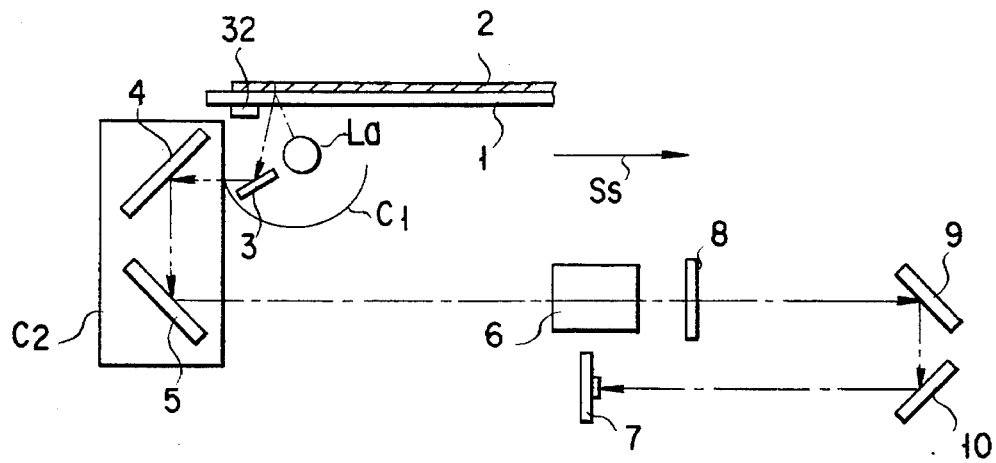
F I G. 1
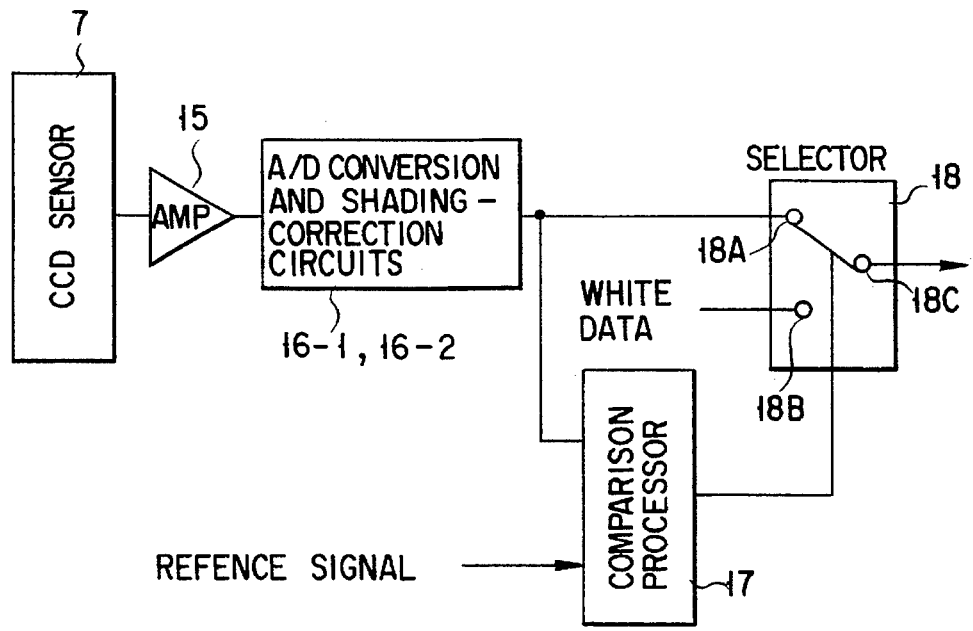
F I G. 2
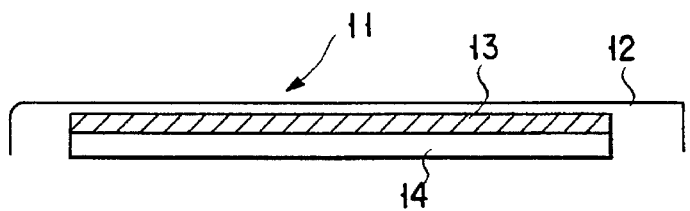
F I G. 3 ced based on digital image 15 the reading device.
IMAGE READING DEVICE FOR REMOVING THE BACKGROUND OF A SCANNED ORIGINAL DOCUMENT This application is a continuation of application Ser. No. 08/277,261, filed Jul. 21, 1994; which is a continuation of application Ser. No. 08/035,790, filed Mar. 23, 1993, both now abandoned.

BACKGROUND OF THE INVENTION

1. Field of the Invention

The present invention relates to an image reading device for reading an image on an original sheet, and an image forming device for forming an image based on digital image data read by the reading device, more specifically, a digital copying machine which blanks the background other than the original sheet by electrically judging the size of the original sheet from the data read out.

2. Description of the Related Art

In conventional copying machines, a white reflection plate on the original sheet cover avoids blackening of the section other than the original sheet when an original sheet having a size smaller than the set sheet size is copied. When copying an original sheet, the sheet is placed on the original sheet glass, and the front surface of the sheet glass is covered by the white reflection plate. However, with the conventional technique, when a three-dimensional object is copied, the reflection plate cannot be set properly on the original, rendering the background section of the original on a copying sheet gray or black.

Some conventional copying machines include a frame erasing function for the purpose of overcoming such a drawback. The frame erasing function detects the size of a sheet used for copy, and controls copying so as not to form any image in the sheet's periphery section of a certain width. The conventional frame erasing function has a member for erasing the unwanted section in advance by exposing the section to light from its light source before developing the static latent image.

In other conventional copying machines, the position and the size of an original is detected before start of a copying machine, and only the detected region of the original is copied. More specifically, there is a known method in which a metal reflection plate is used for the original sheet press surface of the sheet cover, and pre-scanning is performed with a light beam so as to detect the four corners of the original based on the difference between the intensity of the reflection light from the original and that from the original press surface. There is also a known method in which the original press surface of the original cover is coated with a fluorescent paint, and pre-scanning is performed by use of a filter transmitting only the light having a certain wavelength so as to detect the four corners of the original based on the difference between the intensity of the reflection light from the original and that from the original press surface.

The frame erasing function using a light source is effective in the case where an original image is copied on a copy sheet at substantially the same magnification; however in the case where the original image is small, the periphery of the original sheet is inevitably blackened. In the method of detecting the position and size of an original before start of a copying operation, detection of the size is in many cases based on typical sizes such as A4 and B4. Further, when the original is placed inappropriately, it is judged to be a wrong size.

As described above, with the conventional copying machines, the automatic sheet size detection function cannot detect any sheets not rectangular. Further, with copying machines having an original press coated with fluorescent paint, the sheet size cannot be detected when the original press is not appropriately set on the original sheet.

SUMMARY OF THE INVENTION

The purpose of the invention is to provide an image reading device for reading an image, which can accurately detect or erase the region other than the original, regardless of the original size, or how the original is placed, and an image forming device for forming an image, which includes the reading device.

According to the invention, there is provided an image scanning apparatus, comprising:

means for scanning target areas from a first edge area to a second edge area, the target area including original document areas;

means for producing an image signal representative of the shade of darkness of areas scanned by the scanning means, the image signals having dark image signals corresponding to the darkness of the target areas except the original document areas and bright image signals corresponding to the darkness of the target areas brighter than the target areas corresponding to the dark image area;

means for detecting a first bright image signal and a last bright image signal which are the first signal and the last signal of the bright image signals produced by the producing means in the scanning direction; and means for eliminating the image signal from the image signals corresponding to the first edge areas to the first bright image signals and from the last bright image signal to the image signal corresponding the image signal corresponding to the second edge area.

According to the invention, there is also provided an image reading device comprising:

means for scanning target areas from a first edge area to a second edge area, the target area including original document areas;

means for producing image signals representative of the shade of darkness of areas scanned by the scanning means, the image signals having dark image signals corresponding to the darkness of the target areas except the original document areas and bright image signals corresponding to the darkness of the target areas brighter than the target areas corresponding to the dark image area;

means for detecting a first bright image signal and a last bright image signal which are the first signal and the last signal in the bright image signals produced by the producing means in the scanning direction;

means for eliminating the image signal from the image signals corresponding to the first edge areas to the first bright image signals and from the last bright image signal to the image signal corresponding the image signal corresponding to the second edge area; and means for forming an image on an image forming medium in accordance with the image signal from the eliminating means.

In an image forming device, image data is read, a picture element of the image data is compared with a reference value so as to detect each of edges of an original sheet, and picture element signals having a value smaller than the reference value located outside the edges of the original sheet are replaced with white data, thereby to blank the section other than the image on the original by creating a white background.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram showing an optical system of an image reading device, for reading an image, the image reading device being built in an image forming device according to the present invention;

FIG. 2 is a block diagram showing a processing circuit for an image signal of an image reading device built in an image forming device according to the invention;

FIG. 3 is a cross section of the structure of an original sheet cover set on an image forming device according to the invention;

DETAILED DESCRIPTION OF THE PREFERRED EMBODIMENTS

Figure 4A:
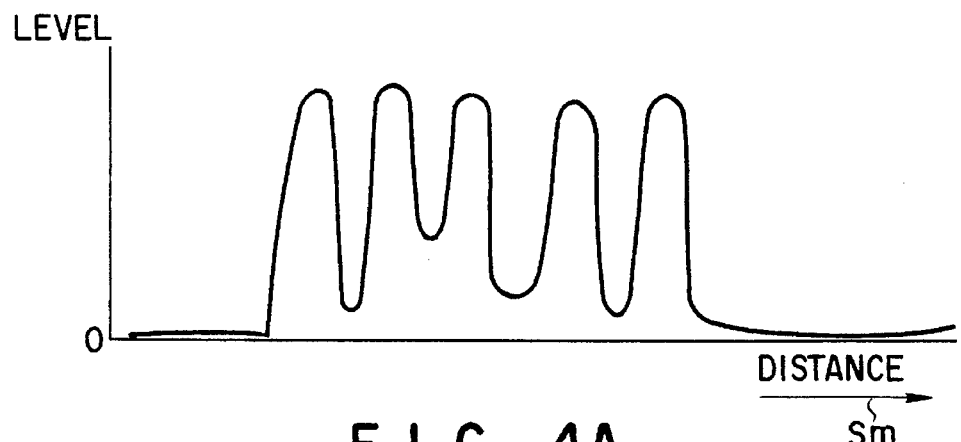
FIGS. 4A and 4B are waveform diagrams respectively showing one line image signal after a shading correction, and one line image signal after a black/white replacing correction, in the circuit shown in FIG. 2.

An image reading device for reading an image, and an image forming device for forming an image in accordance with the read image data, according to an embodiment of the present invention, with reference to accompanying embodiment.

FIG. 1 is a schematic diagram showing an optical system of an image reading device, for reading an image, the image reading device incorporated in an image forming device, and FIG. 2 is a block diagram showing a processing circuit for an image signal of an image reading device.

As can be seen in FIG. 1, the first and second carriages C1 and C2 are arranged movably in a sub-scanning direction Ss, below an original sheet glass 1. The first carriage C1 includes a light source such as a fluorescent lamp La for irradiating light rays or beams on an original sheet 2 via the original sheet glass 1, and the inner surface of the first carriage C1 is a recess-shaped curved mirror.

With the described structure, a light beam from the fluorescent lamp La irradiates substantially uniformly on a target region such as a band-like region of the original sheet 2, the region being set along the main scanning direction Sm perpendicular to the sub-scanning direction Ss. In the carriage C1, there is provided a flat surface mirror 3 so as to transmit the reflection light beam from the original 2. The reflection light beam from the original 2 is directed in a direction opposite to the sub-scanning direction by means of the flat surface mirror 3, and reflects lights onto a flat surface mirror 4 provided in the second carriage C2 so as to direct the light beam path at a right angle.

In the second carriage C2, there is also provided a flat surface mirror 5, which is similar to the mirror 4, for directing the light beam path at a right angle. A light beam made incident on the flat surface mirror 4 reflects onto the flat surface mirror 5, so as to proceed along a light beam path in parallel with a light beam path running from the mirror 3 to mirror 4, in other words, to be direct in the sub-scanning direction.

In the proceeding re-direction of the light beam path, there is provided a focusing lens 6, by which the light beam proceeding along the main scanning direction and containing the image data of the original 2 is focused toward a CCD sensor 7. Between the focusing lens 6 and the CCD sensor 7, there are arranged a filter 8 for transmitting visible rays and flat surface mirrors 9 and 10. With this structure, only the visible ray components of the focused light beam concentrated by the focusing lens 6, are transmitted through the filter 8, and the light beam having visible components is directed to the flat surface mirrors 9 and 10. The light beam reflects on the two flat surface mirrors 9 and 10 each time at right angle, and therefore is directed to a direction opposite to the sub-scanning direction, and then made incident on the CCD sensor 7.

The first and second carriages C1 and C2 can be moved in the sub-scanning direction Ss as mentioned before, but a motion speed V1 of the first carriage C1 is set to be substantially two times as fast as the motion speed v2 of the second carriage C2.

Consequently, even if the reading region of the original 2 in the sub-scanning direction Ss moves due to movement of the first carriage C1, the distance of the light path from the region to the focusing lens 6 is maintained at constant, thereby maintaining the distance to the CCD sensor 7 at constant. Therefore, the magnification of the optical system shown in FIG. 1 is always constant, regardless of any motion of the first and second carriages C1 and C2. Thus, the relationship between an object point and an image forming point is always kept between the scanning region on the original 2 and the CCD sensor 7, and the image in the line-like scanning region of the original 2, the region being set along the main scanning region Sm, is formed on the CCD sensor 7.

An original sheet cover 11, as shown in FIG. 3, is provided on the housing of the image forming device such that the cover can be placed on an original sheet glass 1. Further, as shown in FIG. 1, an open/close sensor 32 for detecting opening/closing of the cover 11 is provided for the housing of the image forming device. In the original sheet cover 11, a material for absorbing light rays, for example, a plate-like, light-absorbing member 13, made of black sponge, is adhered to an original sheet cover frame 12, and a transparent member 14 such as a transparent vinyl sheet for allowing light rays to transmit therethrough, and which is brought into tight contact with the original sheets, is adhered to the light absorbing member 13. By use of the original sheet cover 11, reflection of a light beam from the original sheet cover 11 to the optical system shown in FIG. 2 can be suppressed to a low level, and therefore the boundary of the original 2 can be accurately detected.

The light beam transmitting through the black ink portion of the sheet 2 into the cover 11 can be attenuated sufficiently such as to prevent the light beam from returning to the original 2, thus the image of the original 2 can be sharpened. More specifically, in the original sheet cover 11 shown in FIG. 3, the light beam entering the cover 11, directly or via the original 2, is dispersed by the transparent member 14, and made incident on the light absorbing member 13, where the light is attenuated. Even if there are a slight amount of light components reflecting onto the light absorbing material 13, the light components are dispersed once again by the transparent member 14, and therefore the amount of the light components reflecting, as shown in FIG. 3, can be reduced to an extremely small level.

The processing of an image signal from the CCD 7 will now be described.

When the copy start key of the key input section (not shown) of the image forming device is pressed by the operator, the first and second carriages C1 and C2 start to move in the sub-scanning direction Ss. During this motion, the image on the sheet is transferred in a line-wise fashion one after another along the main scanning direction Sm, and line image signals corresponding to the target images of the document, glass plate 1 and the cover 11 are consecutively output from the CCD sensor 7. The image signals represents the shade of darkness of the target areas. The line image signals thus output are amplified as serial data in an amplifier 15, shown in FIG. 2, and input to A/D converting and shading correction circuits 16-1 and 16-2, where the analog line image signals are converted to digital line image signals, and shading caused by an irregular irradiation of an exposure lamp La and an irregular sensitivity of the CCD sensor is corrected.

Figure 4B:
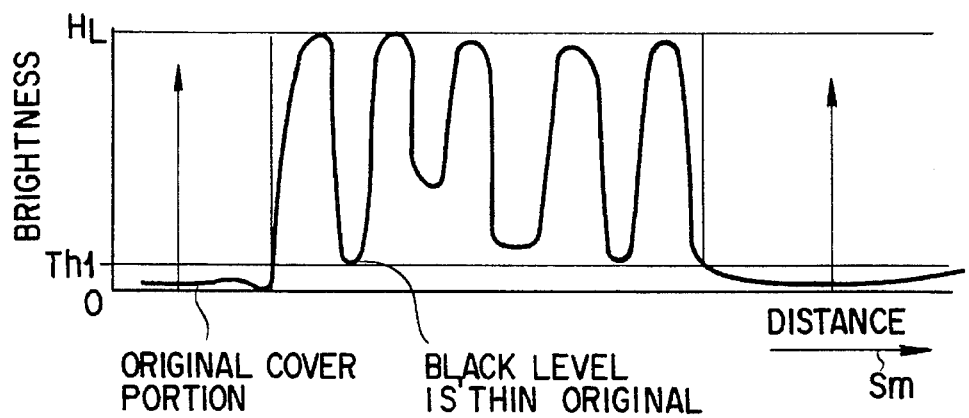

As shown in FIG. 2, the shading-corrected digital line image signals are input to a comparison processor 17 and one of the input terminals of selector 18 as the serial data. In the comparison processor 17, the image signals are compared with the first reference signal Th1, shown in FIG. 4B, and those having a level lower than the first reference signal Th1 are judged to be black. While the image signals having a black level are input, the selector 18 connects the terminal 18B to which white data is input in accordance with a switching signal from the comparison processor 17, to the output terminal 18C. Consequently, the black image signal is converted to a white image signal, and output from the output terminal 18C. In the case where an image signal having a level of the first reference signal Th1 or higher is detected, the position P0 of the signal is judged to be a leading edge of the original 2 on the main scanning line corresponding to the image signal, and a switching signal is supplied from the comparison processor 17 to the selector 18 so as to connect terminal 18A, to which image signals are input, to the output terminal 18C. Therefore, image signals are output from the selector 18 as they are. In the case where an image signal having a level lower than the first reference signal Th1 is detected by the comparison processor 17, the position PL of the signal is judged to be a tailing edge of the original 2 on the main scanning line corresponding to the image signal, and a switching signal is supplied from the comparison processor 17 to the selector 18 so as to connect the terminal 18B, to which white image data is input, to the output terminal 18C. Therefore, white image Signals obtained by converting from a black image are output from the selector 18.

Figure 5:
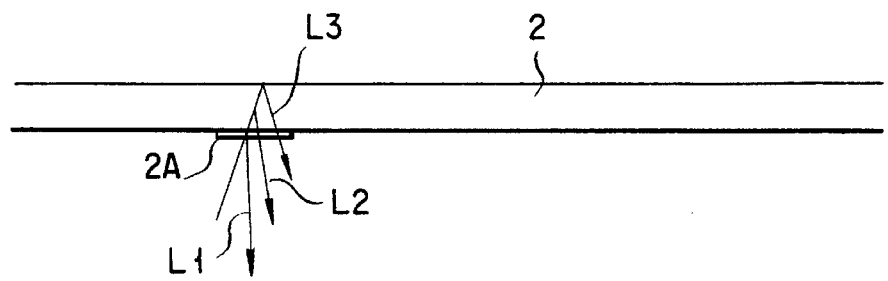
FIG. 5 is a schematic diagram showing types of reflection light beams from the original sheet.

The level of the first reference signal Th1 is determined based on the level of the dark current of the CCD sensor 7, and the intensity of the reflection light beam from the black ink portion of the original 2. More specifically, in the original sheet cover 11 having a structure shown in FIG. 3, the reflection light beam from the sheet cover 11 has a level lower than the sensitivity of the CCD sensor 7, and therefore the A/D converted value of the level should be theoretically 0. However, in reality, the value will not be 0 due to noise such as a dark current, which is produced in a CCD sensor. Consequently, the level of the first reference signal Th1 is set to be higher than the dark current level. A slight portion of the light beam made incident on black ink portion 2A of the original shown in FIG. 5 reflects on the surface. Otherwise, a portion of the light, the portion being depending on the density of the black ink 2A, transmits through the black ink portion of the original sheet 2 into the sheet, once again reflecting in the sheet or on the rear surface of the sheet 2. The reflection component L1 from the black ink portion 2A of the original sheet 2, the component L2 from the inside of the sheet 2, and the component L3 from the rear surface of the sheet 2 are directed to the CCD sensor 7, where they are detected. The level of the first reference signal Th1 is determined such that it is not lower than the level of the image signal thus detected. The leading and tailing edge of the original sheet 2 along the main scanning line can be accurately detected by setting the level of the first reference signal Th1 as explained above.

An example of the circuit structure of the device will be described in more detail with reference to FIG. 6.

Figure 6:
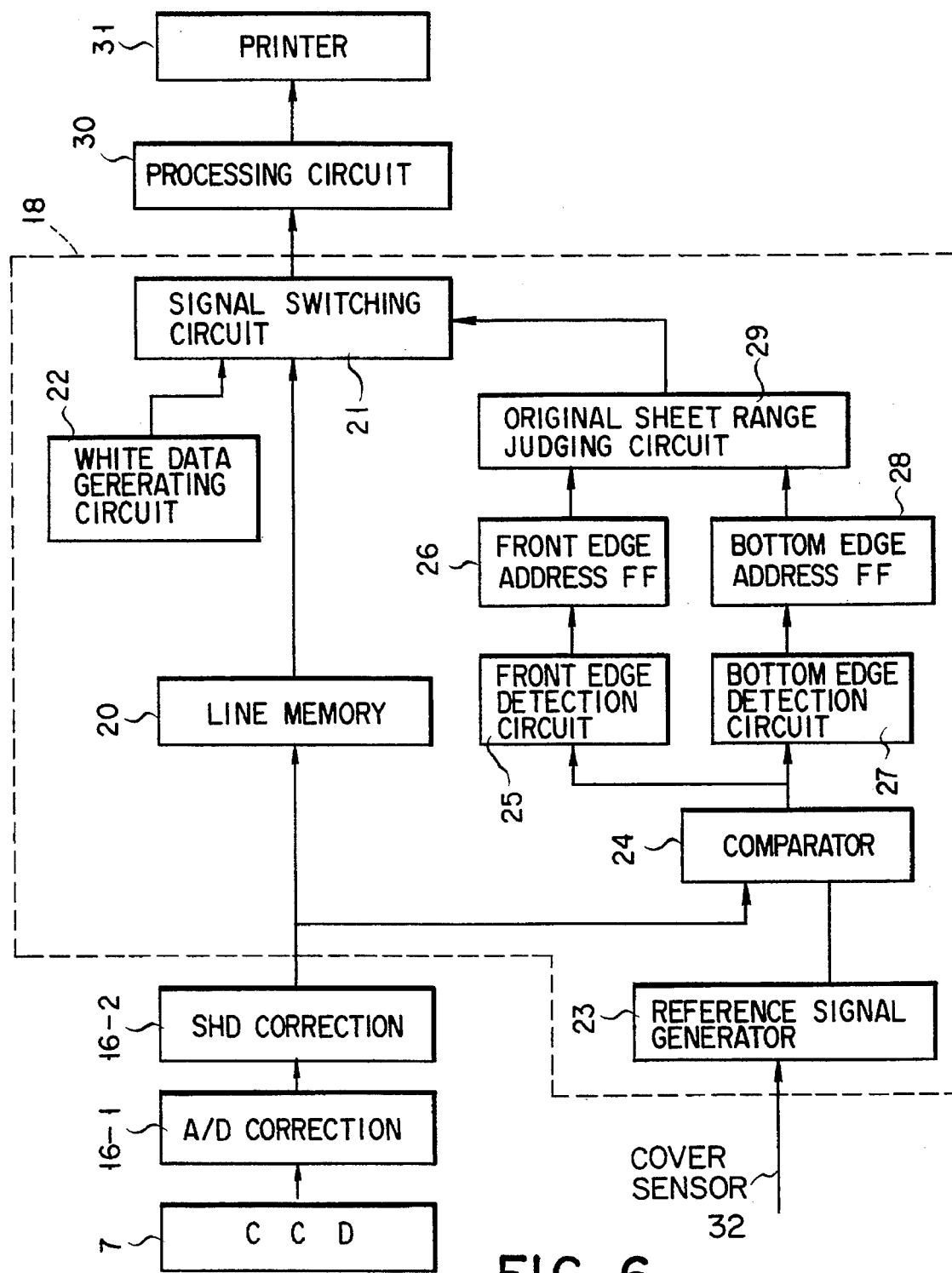
FIG. 6 is a circuit block diagram showing an example of the circuit structure of the image reading device of the invention.

As shown in FIG. 6, a line memory 20 for consecutively storing digital line image signals each corresponding to one scanning line, is connected to the shading correction circuit 16, to which is also connected a signal switching circuit 21 for selectively and serially outputting either each picture element signal of the digital line image signal for one scanning line or white data picture element signal from the white data generating circuit 22.

Further, in the comparison processor 18, a comparator 24 for comparing a dot signal of the digital line image signal corresponding to one scanning line with the first reference value from the reference value generator 23, is connected to the shading correction 10 circuit 16. To the reference value generator 23 is connected a cover open/close sensor 32 for detecting the opening/closing of the cover. When the cover is closed, the first reference signal Th1 is generated from the reference value generator 23, whereas when the cover is open, the second reference signal Th2 is generated from the reference value generator 23. Comparator 24 is connected to a leading edge detection circuit 25 and a tailing edge detection circuit 27, which generate a leading edge detection signal and a tailing edge detection signal, respectively, by detecting the leading edge and the tailing edge of the original 2 from the comparison result from the comparator 24. To the leading end detection circuit 25 and the tailing end detection circuit 27 are respectively connected a leading end FF (flip-flop) 26 for generating a high-level signal in accordance with the leading edge detection signal, and a tailing edge FF (flip-flop) 28 for generating a high-level signal in accordance with the tailing edge detection signal, and the leading and tailing edge FFs 26 and 28 are further connected to an original sheet range judging circuit 29 for switching the contact point of the signal switching circuit 21 in accordance with the signal outputs.

Figure 7:
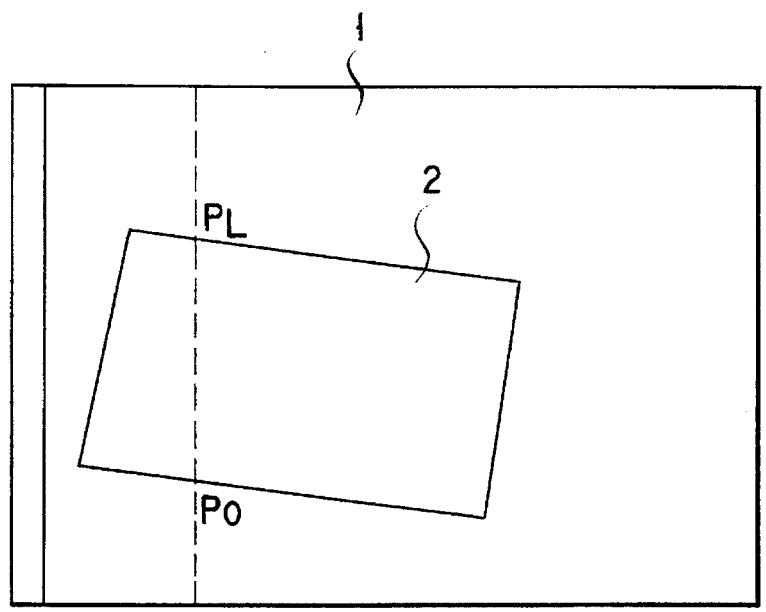
FIG. 7 is a plan view showing an example of arrangement of an original sheet base and an original sheet, designed to explain the principle for detecting the top and tailing ends of an original sheet used in the image forming device of the invention.

In the circuit structure shown in FIG. 6, a dot signal is supplied to the line memory 20 and the comparator 24 synchronously with the clock pulse. The initial dot signal of one scanning line indicated by the broken line in FIG. 7 is of a black image, and therefore a low-level comparison result is output from the comparator 24. At this point, the leading and tailing edge FFs 26 and 28 are not set, generating a low-level output in a similar manner to the above. Consequently, the sheet range judging circuit 29 judges that a dot signal is input out of the sheet range, and connects the contact point of the signal switching circuit 21 to the white data generating circuit 22. Hence, even if a dot signal corresponding to a black image is supplied from the line memory 20 to the signal switching circuit 21, a dot signal corresponding to a white image is supplied from the signal switching circuit 21 to the processing circuit 30 in synchronously with the clock.

When a number of dot signals each corresponding to a white image of the leading edge P0 of the original 2 are starting to be supplied one after another to the line memory 20 and the comparator 24 in synchronously with the clock, the line memory 20 stores the dot signals in the order of input, and the comparator 24 compares each of the dot signals consecutively with the first reference value Th1, and generates high-level dot signals as the comparison results. The comparison results are continuously supplied to the leading edge detection circuit 25. When dot signals having a level higher than the first reference value Th1 exceed a predetermined number, the leading end detection circuit 25 judges that the dot signal of the leading edge of the original 2 has been input, and supplies a leading edge detection signal to the leading edge FF (flip-flop) 26. A high-level signal is output from the leading edge FF 26, and in accordance with the high-level signal from the leading edge FF 26, the original sheet range judging circuit 29 switches the signal switching circuit 21, and outputs the dot signal from the line memory 20 to the processing circuit 30.

While the white image corresponding to the region P0–PL on the original 2 is being supplied to the line memory 20 and the comparator 24, the line memory 20 is connected to the processing circuit 30, and the dot signals of the original 2 are directly supplied to the processing circuit 30.

When the dot signals corresponding to the tailing end PL of the original 2 are supplied to the line memory 20 and the comparator 24 in synchronism with the clock, the line memory 20 stores the dot signals, and the comparator 24 compares each of the dot signals consecutively with the first reference value, and outputs low-level dot signals as comparison results. Then, when a predetermined number of low-level comparison results are supplied to the tailing edge detection circuit 27, the tailing edge detection signal 27 judges that the dot signal of the tailing edge of the original 2 has been input, and supplies the tailing edge detection signal to the tailing edge FF (flip-flop) 28. A high-level signal is generated from the tailing edge FF 28, and in response to the high-level signal from the tailing edge FF 28, the original sheet range judging circuit 29 switches the signal switching circuit 21, and connects the white data generating circuit 23 to the processing circuit. Consequently, even if a dot signal corresponding to a black image is supplied from the line memory 20 to the signal switching circuit 21, a dot signal corresponding to a white image is supplied from the signal switching circuit 21 to the processing circuit 30 in synchronism with the clock.

The dot signals corresponding to one line are supplied to the processing process 30, the leading and tailing edge FFs 26 and 28 are reset. In other words, the leading and tailing edge FFs 26 and 28 are reset by a scanning signal.

In the circuit structure shown in FIG. 6, the line memory 20 serves as a type of buffer. More specifically, until the leading or tailing edge is detected, the dot signal corresponding to the leading or tailing edge is not supplied to the signal switching circuit 21. Consequently, the black dots located outside the original can be converted into white dots.

A dot signal supplied to the processing circuit 30, that is, an image signal, is subject to a filtering process, a gamma correction process, or an enlarge/reduction process, and converted into an ink amount signal, which is further supplied to a printer 31. In the printer 31, printing is executed in accordance with the ink amount signal, so as to form an image on an image forming device. As is clear from the above operation, in the image thus formed, the section other than the original is printed in white.

By means of the above process, even if the original 2 is placed obliquely, the leading edge P0 and the tailing edge PL of the original 2 can be detected for each scanning line. Therefore, a region other than that of the original can be converted into a white image, and the region of the image forming medium other than the original can be formed in white.

The following is an explanation of the case where an original sheet is three-dimensional, for example, a thick original such as a book. In the case where an image of a thick original such as a book is read, the original sheet cover cannot be closed properly. Therefore, the state of the original sheet cover being open is detected by the cover open/close sensor 32 shown in FIG. 6, and in response to the open signal from the sensor 32, the reference signal generator 32 outputs the second reference signal Th2 (in place of the first reference signal Th1) to the comparator 24.

Figure 8:
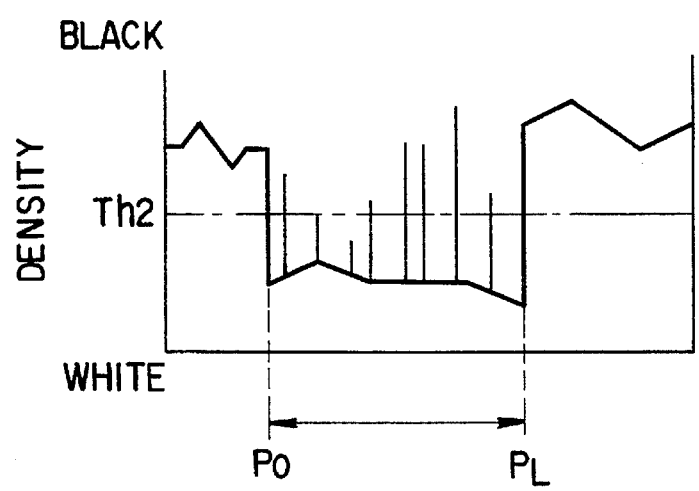
FIG. 8 is a waveform diagram showing a one line image signal obtained when the original sheet cover of the image forming device of the invention is open.

The level of the second reference signal Th2 is set to be higher than the level of the first reference signal Th1 as shown in FIG. 8. In the case where an image of a thick original sheet, such as a book, is read, the original sheet cover cannot be closed. Therefore, external light enters in the original sheet glass 1, and the light may be detected by the CCD 7 to be of a lower density than that of the black portion of the original 2. This is the reason why the level of the second reference signal Th2 is set to be higher than that of the first reference signal Th1.

In the circuit structure shown in FIG. 6, the cover open/close sensor 32 detects that the cover is closed, the second reference signal Th2 is generated from the reference value generator 23 in place of the first reference signal Th1. When a dot signal is supplied to the line memory 20 and the comparator 24 in synchronism with the clock, the initial dot signal of one scanning line indicated by the broken line in FIG. 7 is a dot signal corresponding to a black or gray image having a level flower than the second reference signal Th2, and therefore a low-level comparison result is output from the comparator 24. At this point, the leading and tailing edge FFs 26 and 28 are not set, generating a low-level output in a similar manner to the above. Consequently, the sheet range judging circuit 29 judges that a dot signal out of the sheet range is input, and connects the contact point of the signal switching circuit 21 to the white data generating circuit 22. Hence, a dot signal corresponding to a white image is supplied to the processing circuit 30 in synchronism with the clock.

When a number of dot signals each corresponding to a white image of the leading edge P0 of the original 2 are supplied one after another to the line memory 20 and the comparator 24 in synchronism with the clock, the line memory 20 stores the dot signals in the order of input, and the comparator 24 compares each of the dot signals consecutively with the second reference value Th2, and generates high-level dot signals as the comparison results. The comparison results are continuously supplied to the leading edge detection circuit 25. When dot signals having a level higher than the first reference value Th1 exceed a predetermined number, the leading end detection circuit 25 judges that the dot signal of the leading edge of the original 2 has been input, and supplies a leading edge detection signal to the leading edge FF (flip-flop) 26. A high-level signal is output from the leading edge FF 26, and in response to the high-level signal from the leading edge FF 26, the original sheet range judging circuit 29 switches the signal switching circuit 21, and outputs the dot signal from the line memory 20 to the processing circuit 30.

While the white image corresponding to the region P0-PL on the original 2 is being supplied to the line memory 20 and the comparator 24, the line memory 20 is connected to the processing circuit 30, and the dot signals of the original 2 are directly supplied to the processing circuit 30.

When the dot signals corresponding to the tailing end PL of the original 2 are supplied to the line memory 20 and the comparator 24 in synchronism with the clock, the line memory 20 stores the dot signals, and the comparator 24 compares each of the dot signals consecutively with the second reference value Th2, and outputs low-level dot signals as comparison results. Then, when a predetermined number of low-level comparison results are supplied to the tailing edge detection circuit 27, the tailing edge detection signal 27 judges that the dot signal of the tailing edge of the original 2 has been input, and supplies the tailing edge detection signal to the tailing edge FF (flip-flop) 28. A high-level signal is generated from the tailing edge FF 28, and in response to the high-level signal from the tailing edge FF 28, the original sheet range judging circuit 29 switches the signal switching circuit 21, and connects the white data generating circuit 21 to the processing circuit 21. Consequently, a dot signal corresponding to a white image is supplied to the processing circuit 30 in synchronism with the clock.

The dot signals corresponding to one line are supplied to the processing circuit 30, the leading and tailing edge FFs 26 and 28 are reset. In other words, the leading and tailing edge FFs 26 and 28 are reset by a scanning signal.

Another example of the circuit structure of the image reading device will not be described with reference to FIG. 9.

Figure 9:
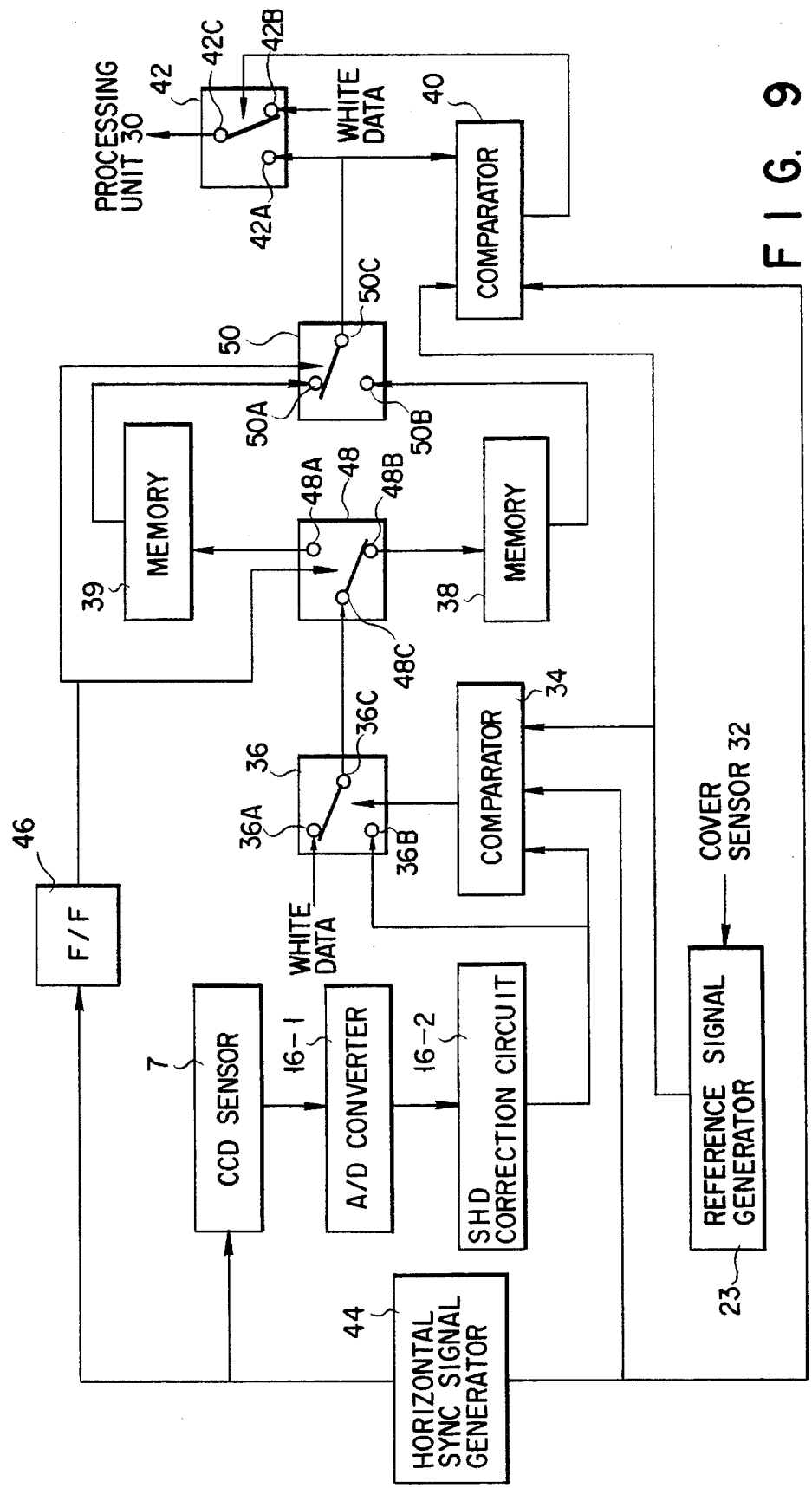
FIG. 9 is a circuit block diagram showing another example of the circuit structure of the image reading device of the invention.

In the circuit structure shown in FIG. 9, as in the case of the circuit shown in FIG. 2, the first comparator 34 and the switch terminal 36B of the first selector 36, which is switched by the first comparator 34, are connected to the shade correction circuit 16-2, to which an image signal is output. To an output fixed terminal of the first selector 36C is connected a fixed terminal 48C of the second selector 48. To switch terminals 48A and 48B of the second selector 48 are connected input sides of line memories 38 and 39. To the line memories 38 and 39, one line serial image data items are input alternately, but when the data items are output, they are read out in the reverse order to that of input by means of a register. More specifically, when one line serial image data items are input to each of the line memories 38 and 39, signal input starts from a digital signal corresponding to the first dot, and signals are input serially in the order, until the digital signal corresponding to the final dot.

In contrast, when the image data items are output from the line memories 38 and 39, data output does not start from the digital signal corresponding to the first dot, but starts from the digital signal corresponding to the final dot. Further, the digital signals are output from the digital signal corresponding to the final dot in this reverse orders and, finally the digital signal corresponding to the first dot is output. To output sides of the line memories 38 and 39 are connected switching terminals 50A and 50B of the third selector 50. To a fixed side output terminal of the third selector 50 are connected the second comparator 40 and the fourth selector 42 which can be switched over by the second comparator 40. The fourth selector 42 is connected to the processing circuit 30. The first and second comparators 34 and 40 are connected to the reference signal generator 23 for generating a reference signal, and to a horizontal synchronous signal generator 44 for generating a horizontal synchronous signal, with which timing for transferring one line serial image data generated by the CCD sensor 7 is obtained. The first and second comparators 34 and 40 receive the synchronous from the horizontal synchronous signal generator 44 as a reset signal, and are reset by the synchronous signal. Further, the horizontal synchronous signal generator 44 is connected to the F/F 46, and by the output signal from the F/F 46, the third and fourth selectors 48 and 50 are switched over. In other words, the third and fourth selectors 48 and 50 are switched over in response to the horizontal synchronous signal.

In the circuit structure shown in FIG. 9, a black dot is replaced with a white dot, and an image signal is corrected in the following manner. From the CCD sensor 7, line image signals are generated consecutively in synchronism with the horizontal synchronous signal from the horizontal synchronous signal generator 44. The line image signals generated are amplified as serial data, and input to the A/D converter 16-1, where analog line image signals are converted into digital line image signals. The shading of the digital signals caused by an irregular irradiation of an exposure lamp La and an irregular sensitivity of the CCD sensor is corrected by the shading correction circuit 16-2.

The shading-corrected digital line image signals are input to the first comparator 34 and one of the input terminals of the first selector 36 as the serial data. In the first selector 36, a terminal 36B, to which white data is input, is usually connected to an output terminal 36C. With this structure, even if an image signal corresponding to the first black dot and having a level lower than that of the first reference signal Th1 is input, the selector 36 maintains its state in which the terminal 36B to which white data is input is connected to the output terminal 36C. Consequently, the black image signal is converted into a white image signal, and output from the output terminal 36C. When an image signal having a level higher than that of the first reference signal Th1 is detected in the comparator 36, the position P0 of the signal is judged to be a leading edge of the original 2 on the main scanning line corresponding to the image signal, and a switching signal is supplied from the comparator 36 to the selector 36 so as to connect the terminal 36A, to which image signals are input, to the output terminal 36C. The terminal 36A is continues to be connected to the terminal 36C until the comparator 36 is reset. Therefore, the converted white dots of the initial group, the following image dots, and one line serial image signal containing black dots of the final group are controlled by the second selector 48. In the selector 48, the fixed contact point 48C is connected to the first switching contact point 48B, and, therefore, the one line serial image signal is input to the first memory from the beginning. When one horizontal scanning period is over, a horizontal synchronous signal is generated, and transfer of the next (second) one line serial image signal from the CCD sensor 7 is started. At the same time, the comparators 34 and 40 are reset, and the output of the F/F 46 is switched. Consequently, in the selector 36, the fixed contact point 36C is connected to the switching contact point 36A, whereas in the selector 48, the fixed contact point 48C is connected to the switching point 48A. Further, in the selector 50, the fixed contact point 50C is connected to the switching contact point 50B. Thus, in the initial group of the second one line serial image signal, the black dots are replaced with white data as in the case of the first one line serial image signal, and input to the second memory 39 consecutively from the first dot. After that, the first one line serial image signal stored in the first memory 38 is read via the third selector 50, starting from the edge dot, and is input to the switching terminal 42A of the fourth selector 42, and the comparator 40. In the fourth selector 40, a terminal 42B, to which white data is input, is usually connected to an output terminal 42C. With this structure, even if an image signal corresponding to the first black dot and having a level lower than that of the first reference signal Th1 is input, the selector 42 maintains its state in which the terminal 42B to which white data is input is connected to the output terminal 42C. Consequently, the black image signal is converted into a white image signal, and output from the output terminal 42C. When an image signal having a level higher than that of the first reference signal Th1 is detected in the comparator 40, the position Ph of the signal is judged to be a tailing edge of the original 2 on the main scanning line corresponding to the image signal, and a switching signal is supplied from the comparator 40 to the selector 42 so as to connect the terminal 42A, to which image signals are input, to the output terminal 42C. The terminal 42A continues to be connected to the output terminal 42C until the comparator 40 is reset. Therefore, one line serial image signal is supplied to the processing circuit 30, from the tailing edge dot toward the leading edge dot, in the order of the converted white dots, the following image dots, and the converted white dots. Each time a horizontal synchronous signal is generated, the above-described operation is repeated. One-line serial image signals are alternately stored in the memories 38 and 39, and are alternately read out therefrom. Further, black dots are converted into white dots, and are supplied to the processing device 30, starting from the edge dot.

In the above-described embodiments, each dot signal is compared with a reference value, but some dots can be selected as samples to be compared. In other words, the comparison may be performed for only one of a predetermined number of dot signals, or only a plurality of dot signals.

As described, according to the present invention, the image data of the section where an original sheet is not present can be converted into white data during an image forming operation with a relatively simple structure. Further, detection of whether or not the original is present, and a black/white conversion are performed at real time for each picture element unit, and, therefore, even if the original is placed obliquely, or has an arbitrary shape, the image data of the section where an original sheet is not present can be converted into white data. Moreover, In the case where there is no original, or the original sheet cover has not been closed, or the original is three-dimensional and thick, only the original sheet section is read, and copied. Therefore, the waste of copy sheets and developer due to erroneous copying can be significantly reduced, and a neat copy, with the periphery of a sheet being whitened, can be achieved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus, comprising:

an original document table on which an original document is placed;

a line scanner for scanning, in a main scanning direction and a sub scanning direction different from the main scanning direction, said original document placed on said original document table, thereby to read out one line at a time image data corresponding to said original document;

memory means for storing said image data scanned by said line scanner each time said line scanner performs a reading operation for one line in the main scanning direction;

reading means for reading out said image data from said memory means in units of one line while a sequential line is being scanned by said line scanner;

first outputting means for outputting white image data from the time said reading means reads the first of said image data stored in said memory means until said reading means reads out the front edge of the original document while image data corresponding to a subsequent line is scanned by said line scanner; and second outputting means for outputting white image data from the time the rear edge of said original document is read out until said image data corresponding to the last image of one line is read out by said reading means while image data corresponding to a subsequent line is scanned by said line scanner.

2. An image forming apparatus according to claim 1, further comprising:

third outputting means for outputting said image data read out by said reading means from the time the front edge of said original document is read out until the rear edge of the original document is read out.

3. An image forming apparatus, comprising:

an original document table on which an original document is placed;

a line scanner for scanning, in a main scanning direction and a sub scanning direction different from the main scanning direction, said original document placed on said original document table, thereby to read out one line at a time in the main scanning direction image data corresponding to said original document;

memory means for storing said image data scanned by said line scanner each time said line scanner performs a reading operation for one line;

reading means for reading out said image data from said memory means in units of one line while a sequential line is being scanned by said line scanner;

detecting means for detecting said image data which is read out by said reading means and which image data has a density lower than a predetermined destiny;

first outputting means for outputting white image data from the time said reading means reads the first of said image data stored in said memory means until said detecting means detects the first image data which has a density lower than the predetermined density while image data corresponding to a subsequent line is scanned by said line scanner; and second outputting means for outputting white image data from the time said detecting means detects the last of the image data having a density lower than the predetermined density until said image data corresponding to the last image of one line is read out by said reading means while image data corresponding to a subsequent line is scanned by said line scanner.

4. An image forming apparatus according to claim 3, further comprising:

third outputting means for outputting said image data read out by said reading means from the time said detecting means detects the first of the image data which has a density lower than the predetermined density until said detecting means detects the last of the image data which has a density lower than the predetermined density.

5. An image forming apparatus, comprising:

an original document table on which an original document is placed, the original document covering an area on the original document table corresponding to an original document area;

means for scanning the original document table from a first edge to a second edge in a main scanning direction to produce image signals representative of a shade of darkness of a scanned area, the scanned area scanned by the scanning means including the original document area and areas outside of the original document area, the image signals having a plurality of levels, the scanning means moving in a sub-scanning direction different from the main scanning direction while scanning;

means for comparing the image signals corresponding to the scanned area from the first edge to the second edge with a reference level signal;

means for detecting the image signals corresponding to the areas outside of the original document area on the basis of the comparison performed by the comparing means;

means for converting the image signals detected by the detecting means to predetermined image signals;

means for controlling the comparing means, the detecting means, and the converting means so as to repeat each operation when the scanning means moves in the sub-scanning direction; and means for forming an image on the basis of the image signals except for the predetermined image signals.

6. An image forming apparatus according to claim 5, wherein said detecting means further detects the image signals corresponding to the original document area and said converting means further converts the image signals corresponding to the original document area.

7. An image forming apparatus comprising:

an original document table on which an original document is placed, the original document covering an area on the original document table corresponding to an original document area;

means for scanning the original document table from a first edge to a second edge in a main scanning direction to produce image signals representative of a shade of darkness of a scanned area, the scanned area scanned by the scanning means including the original document area and areas outside of the original document area, the original document having a front and a bottom edge defining interfaces between the original document area and the areas outside of the original document area, the image signals having a plurality of levels, the scanning means moving in a sub-scanning direction different from the main scanning direction while scanning;

means for converting the image signals to digital image signals;

means for storing the digital image signals;

means for comparing the digital image signals corresponding to the scanned area from the first edge to the second edge with a reference level signal;

front edge detecting means for detecting the image signal corresponding to the front edge of the document area on the basis of comparing of the comparing means to generate a front edge signal;

means for converting the digital image signals which correspond to the area outside of the original document area to white image signals and allowing the digital image signals to pass therethrough in response to the front edge signal;

bottom edge detecting means for detecting the image signal corresponding to the bottom edge of the document area on the basis of the comparing means to generate a bottom edge signal;

means for judging the original document area from the front and bottom edge signals;

means for converting the digital image signals which correspond to the area outside of the original document area and supplied from the storing means to white image signals and allowing the digital image signals to pass therethrough on the basis of the judging result from said judging means;

means for controlling the comparing means, the detecting means, and the converting means so as to repeat each operation when the scanning means moves in the sub-scanning direction; and means for forming an image on the basis of the digital image signals except for the white image signals.

8. An image forming apparatus according to claim 7, wherein the original document area has a first density level, the area outside of the original document area has a second density level which is higher than the first density level, and the reference level signal is set to have an intermediate level between the first and second levels.

9. An image forming apparatus according to claim 7, further comprising means for covering the original document table, which includes a surface for absorbing light rays.

10. An image forming apparatus according to claim 9, further comprising:

means for sensing a closing state in which the original document is covered by said covering means to generate a closing signal; and means for setting a second reference level signal in response to the closing signal and causing said comparing means to compare the digital image signals with the second reference level signal.

11. An image forming apparatus comprising:

an original document table on which an original document is placed, the original document covering an area on the original document table corresponding to an original document area;

means for scanning the original document table from a first edge to a second edge in a main scanning direction to produce a line image signal representative of a shade of darkness of a scanned area, the scanned area scanned by the scanning means having an original document area and areas outside of the original document area, the original document having a front and a bottom edge defining interfaces between the original document area and the areas outside of the original document area, the line image signal having a plurality of levels, the scanning means moving in a sub-scanning direction different from the main scanning direction while scanning, wherein the scanning means successively generates a plurality of the line image signals;

means for converting each of the line image signals to respective digital line image signals which include pixel signals;

comparing means for comparing each of the digital line image signals corresponding to the scanned area with a reference level signal to detect the front edge of the document area and to generate a front edge signal as a result thereof;

first converting means, to which each of the digital line image signals are input in an order from a leading edge pixel signal to a tailing edge pixel signal, for converting the pixel signals of the digital line image signals corresponding to the areas outside of the original document area to white pixel signals, and allowing the pixel signals of the digital line image signals to pass therethrough in response to the front edge signal;

storing means for storing the converted digital line image signals from the first converting means;

bottom edge detecting means for detecting the line image signal corresponding to the bottom edge of the document area on the basis of the front edge signal output from the comparing means to generate a bottom edge signal as a result thereof;

second converting means, to which the digital line image signals are input in a order from the tailing edge pixel signal to the leading edge pixel signal, for converting the pixel signals of the digital image signal corresponding to the area outside of the original document area to white pixel signals and allowing the pixel signals of the digital line image signals to pass therethrough in response to the bottom edge signal;

means for controlling the comparing means, the detecting means, and the converting means so as to repeat each operation when the scanning means moves in the sub-scanning direction; and means for forming an image on the basis of the image signals except for the white pixel signals.

12. An image forming apparatus according to claim 11, wherein the original document area has a first density level, the area outside of the original document area has a second density level which is higher than the first density level, and the reference level signal is set to have an intermediate level between the first and second density levels.

13. An image forming apparatus according to claim 11, further comprising means for covering the original document table, which includes a surface for absorbing light rays.

14. An image forming apparatus according to claim 13, further comprising:

means for sensing a closing state in which the original document is covered by said covering means to generate a closing signal; and means for setting a second reference level signal in response to the closing signal and causing said comparing means to compare the pixel signals of the digital line image signals with the second reference level signal.

15. An image forming apparatus according to claim 11, wherein said storing means includes first and second memories in which the line image signals are alternatively input and from which the line image signals are alternatively output.

16. A method of forming an image, comprising steps of:

placing an original document on an original document table, the original document covering on area on the original document table corresponding to an original document area;

scanning the original document table from a first edge to a second edge in a main scanning direction to produce image signal representative of a shade of darkness of a scanned area, the scanned area including the original document area and areas outside of the original document area, the image signals having a plurality of levels, the scanning area being moved in a sub-scanning direction different from the main scanning direction while scanning;

comparing the image signals corresponding to the scanned area from the first edge to the second edge with a reference level signal;

detecting the image signals corresponding to the areas outside of the original document area on the basis of comparing results in the comparing step;

converting the image signals detected by the detecting step to reference image signals;

controlling the comparing step, the detecting step, and the converting step so as to repeat each operation with the scanning area being moved in the sub-scanning direction; and forming an image on the basis of the image signals except for the reference image signals.

* * * * *